(12) United States Patent
Roh

(10) Patent No.: US 7,080,966 B2
(45) Date of Patent: Jul. 25, 2006

(54) CARGO RESTRAINT ANCHOR DEVICE FOR PICK-UP TRUCKS

(75) Inventor: Warren Edward Roh, Littleton, CO (US)

(73) Assignee: The Idea Place, LLC, Littleton, CO (US)

( * ) Notice: Subject to any disclaimer, the term of this patent is extended or adjusted under 35 U.S.C. 154(b) by 0 days.

(21) Appl. No.: 11/038,910

(22) Filed: Jan. 20, 2005

(65) Prior Publication Data

US 2005/0163582 A1 Jul. 28, 2005

Related U.S. Application Data

(60) Provisional application No. 60/538,707, filed on Jan. 23, 2004.

(51) Int. Cl.
*B60P 7/08* (2006.01)

(52) U.S. Cl. .................. 410/102; 410/106; 410/101; 410/143

(58) Field of Classification Search ............... 410/101, 410/102, 106–107, 110–111, 116, 143; 24/265 CD, 24/115 K; 248/499
See application file for complete search history.

(56) References Cited

U.S. PATENT DOCUMENTS 6,129,490 A * 10/2000 Erskine et al. .............. 410/110
6,350,089 B1 * 2/2002 Tekavec ..................... 410/106

* cited by examiner

*Primary Examiner*—Stephen Gordon
(74) *Attorney, Agent, or Firm*—Dale B. Halling

(57) ABSTRACT

Herein is disclosed an improvement for a tie-down and attach-point anchor device for pickup truck beds that clamps to the downward protruding flange of a pickup truck's inner side rail or other similar available surface having an exposed edge. The anchor incorporating a slotted head capable of swiveling to accommodate different angles at which straps, bungees, ropes, and rigid members may be placed to secure or support cargo.

1 Claim, 4 Drawing Sheets

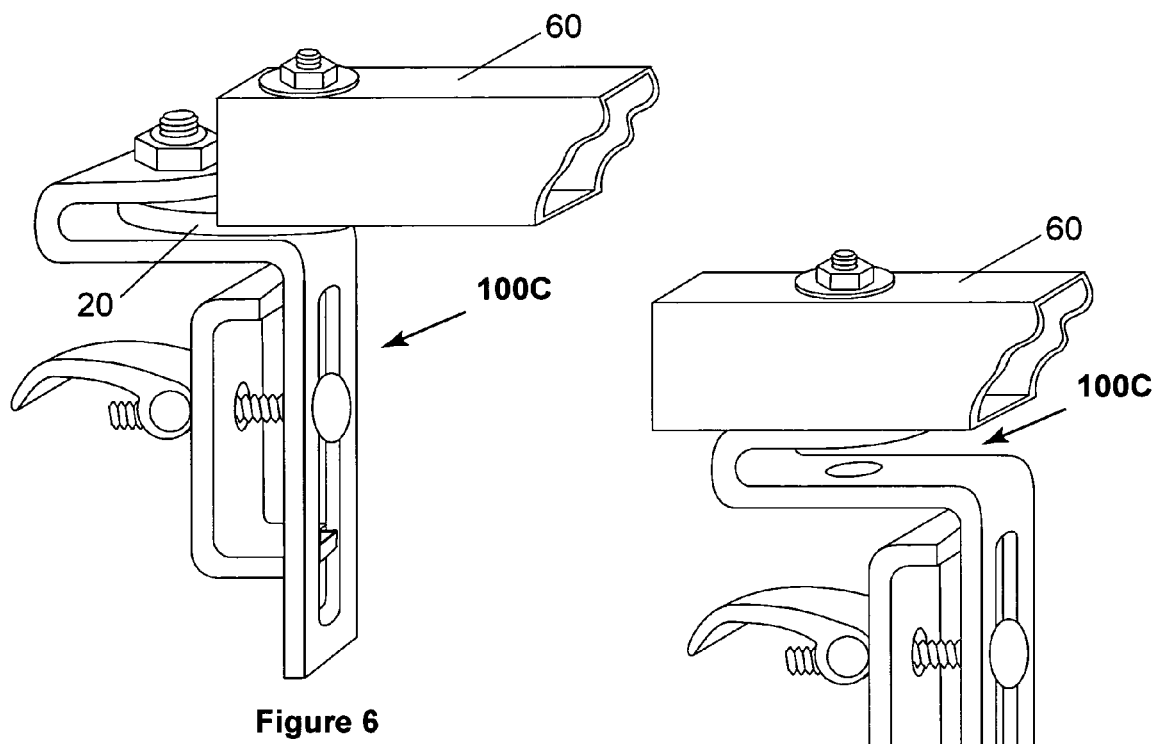
Figure 6
Figure 7
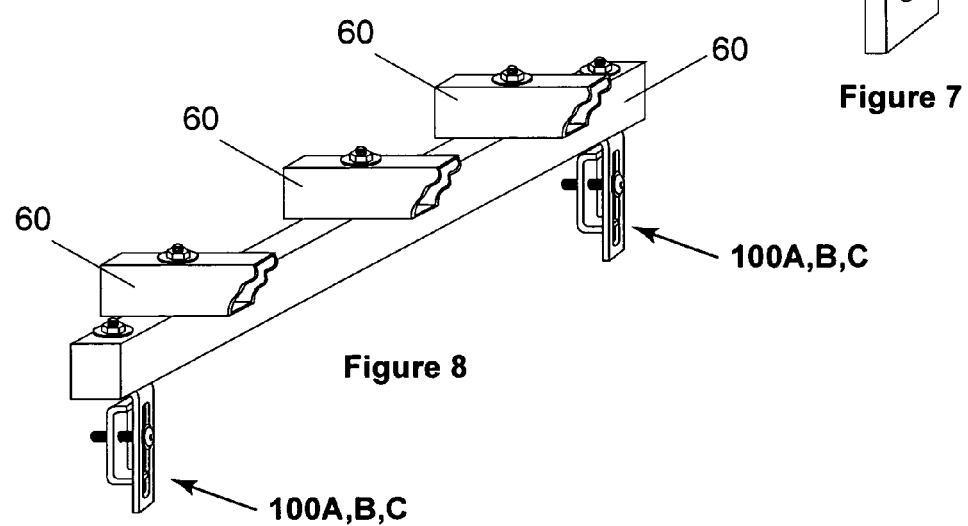
Figure 8

CARGO RESTRAINT ANCHOR DEVICE FOR PICK-UP TRUCKS

RELATED APPLICATIONS

The present application claims priority from the provisional application entitled "Cargo Restraint Anchor Device for Pick-Up Trucks", having application No. 60/538,707, filed on Jan. 23, 2004.

FIELD OF THE INVENTION

The present invention relates to a cargo anchor device designed to allow the restraint of articles that are loaded into the cargo bed of a pick-up truck, and specifically addresses a novel device that attaches anywhere along the downward protruding flange of the inner side rail of the cargo box and functions as an anchor for a cargo restraining strap, bungees, ropes, leashes, solid members, and the like.

BACKGROUND OF THE INVENTION

Pickup trucks are typically purchased to provide a means for transporting cargo. Cargo can be anything loaded into the truck's bed from large commercial palleted loads, building supplies purchased at the local lumber yard, and everything in between. Ideally, to be safe, when cargo is carried in a pickup truck's bed it should be restrained from movement. Restraint is often accomplished by tying the cargo down with a strap or rope utilizing a conveniently located tie-point or attach-point. However, most manufactures of pickup trucks do not incorporate convenient tie-points or attach-points within the bed or along the bed's side rails to aid in the securing cargo from movement within the bed. In addition, the advent of bed liners used to protect the surface of the bed, side panels, and rails from damage by cargo have further complicated the addition or availability of tie-points if factory installed. The present invention solves the problem by providing an aftermarket, easily installable tie-point that can be positioned anywhere along the pickup truck bed's downward protruding flange portion of the inner bed side rail. The present invention can be installed in minutes, and incorporates a swiveling, slotted head for attaching a strap, rope, leash, bungee cord, solid member, and the like. By allowing the head to swivel, a strap or straps threaded through the head can cross at any angle thus providing optimal restraint without bunching or twisting the strapping material.

SUMMARY OF THE INVENTION

The present invention is directed at anchoring cargo to the side rail(s) of a pickup truck's bed. The present invention may also be mounted on any a sheet surface similar to that available on the downward protruding flange of the inner side rail of a pickup truck's bed. The invention consists of a combination of an L-body portion, a C-body portion, and a slotted, swivel head. The inventive cargo anchor's L-body portion and a C-body are tied together with a threaded bolt and nut that cooperate to form a compression clamp, clamping the anchor device on opposing sides of a downward protruding flange of a pickup trucks inner side rail or similar solid sheet surface with an exposed edge. Typically, one or more of the inventive cargo anchors would be mounted to one or both bed side rails. The inventive anchors would then be used to secure cargo within the bed. The inventions unique swiveling head allows optimal stress relief when straps are strung at acute angles to the bed rails.

The above and other features and advantages of the present invention will become more clear from the detailed description of a specific illustrative embodiment thereof, presented below in conjunction with the accompanying drawings.

BRIEF DESCRIPTION OF THE DRAWINGS

FIG. 6 is a top right perspective view of a universal tie down in accordance with one embodiment of the invention;

FIG. 7 is a top right perspective view of a universal tie down in accordance with one embodiment of the invention; and FIG. 8 is a top right perspective view of a universal tie down in accordance with one embodiment of the invention.

DETAILED DESCRIPTION OF THE INVENTION

The following discussion focuses on the preferred and other inventive embodiments of the Cargo Restraint Anchor Device for Pick-up Trucks. However, as will be recognized by those skilled in the art, the disclosed Cargo Restraint Anchor Device for Pick-up Trucks is applicable to a wide variety of situations beyond those discussed. It will be readily apparent that this device will mount on any flat surface with an exposed edge and can be used as a cargo restraint, tie-point for pets, attach point for solid members, as well as many other single-point and multi-point tie-down applications.

PREFERRED EMBODIMENT

Figure 1:
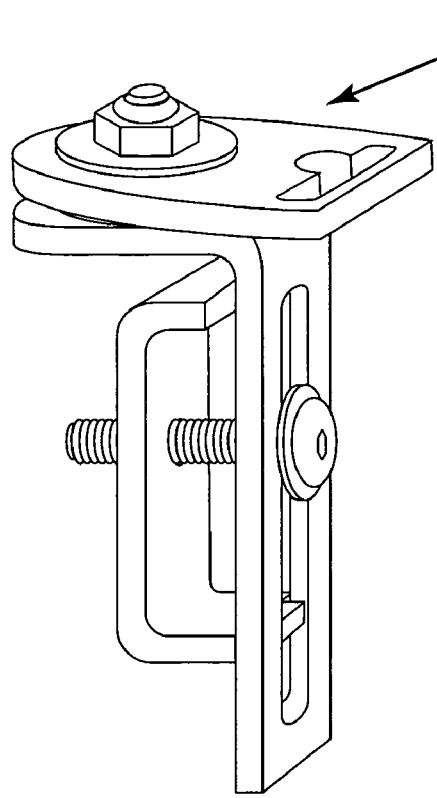
FIG. 1 is a top right perspective view of a universal tie down in accordance with one embodiment of the invention.
Figure 2:
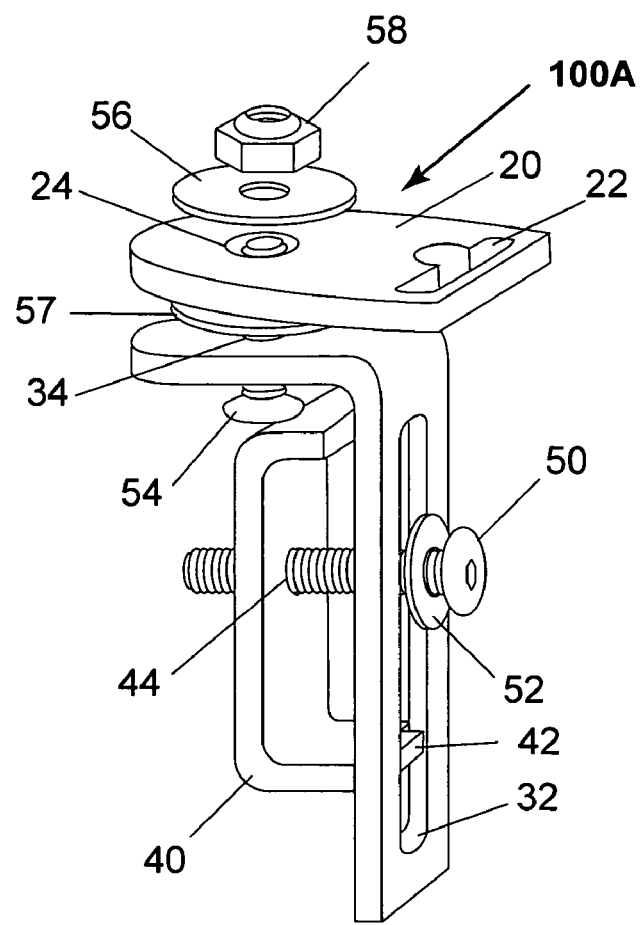
FIG. 2 is a partially exploded top perspective view of a universal tie down in accordance with one embodiment of the invention.
Figure 3:
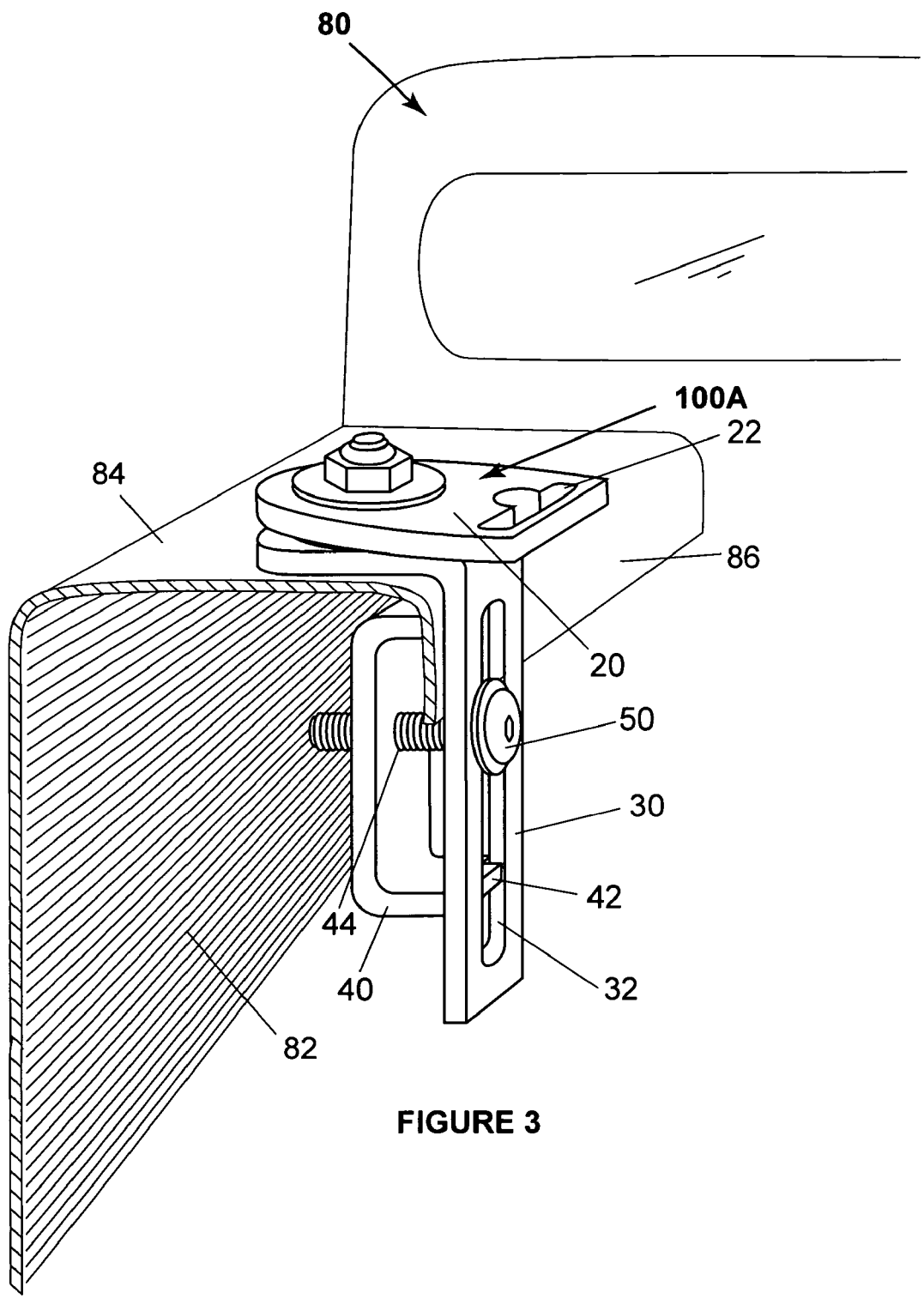
FIG. 3 is a cut away perspective view of a universal tie down attached to a vehicle in accordance with one embodiment of the invention.

The preferred embodiment is illustrated in FIGS. 1, 2, and 3. FIG. 1 illustrates a perspective view of anchor device 100A assembled but not attached to the bed rail of a pickup truck. FIG. 2 illustrates a perspective view of 100A exploded, illustrating individual components. 100A is constructed of three major components consisting of swivel head 20, L-body 30, and C-body 40. Head 20 is fastened to L-body 30 by flat head bolt 54 which passes through bore 34 of L-body 30 and bore 24 of head 20. Flat washers 56 and 57 on the top and bottom sides of head 20 act as spacers and to reduce friction when head 20 swivels. Typically, nut 58 would be lightly torqued but not torqued fully on bolt 54 allowing head 20 to swivel around bolt 54's longitudinal axis. Slot 22 is cut in head 24 to facilitate the insertion of a tie-down strap or hook when used with strapping materials or a through-bolt when used with solid a solid member, FIGS. 6, 7, and 8 solid member 60. C-body 40 contains tapped bore 44 to receive the treads of bolt 50. Washer 52 provides a buffer interface between slot 32 and the head of bolt 50. FIG. 3 illustrates a perspective view of 100A attached to the downward protruding flange portion 86 of the left inner bed side rail 84 of pickup truck 80. It can be seen in the -cut the left pickup truck bed side wall 82, rail top 84, and flange 86, that C-body 40 and L-body 30 are being drawn together by tightening bolt 50, thus clamping anchor 100A to flange 86. The higher the torque applied to bolt 50, the tighter the clamping action. When bolt 50 is loosened, the entire 100A assembly can be moved anywhere along flange 86. When installed on a pickup truck's side rail, the horizontal portion of L-body 30 is essentially parallel to top rail 84. The bottom of the horizontal portion of L-body 30 is typically contiguous to top rail 84; however, if a bed liner, not illustrated, were installed in the pickup truck's bed, the bottom of the horizontal portion of L-body 30 would be contiguous to top of the bed liner. Slot 32 allows for an adjustable fit based on different height flange rails 86 and bed liner thicknesses. Tab 42 fits into slot 32 and cooperates with bolt 50 to prevent C-body 30 from rotating when bolt 50 is torqued. When one or more anchor 100A's are installed on opposing side rails of a pickup truck's bed, tie-down strapping or solid members may be attached between them. Strapping can then act to apply bias force against cargo being carried thus reducing the chance of the cargo shifting. In the case of solid members, FIG. 8-60, the members may be bolted through slot 22 to provide a strong, stable mounting. Anchor 100A can also be used on only one side rail to restrain such articles as ladders, bicycles, and the like. Swivel head 20 allows straps installed through slot 22 to always be optimally stress loaded no matter what angle the straps are strung at across the truck's bed.

Figure 4:
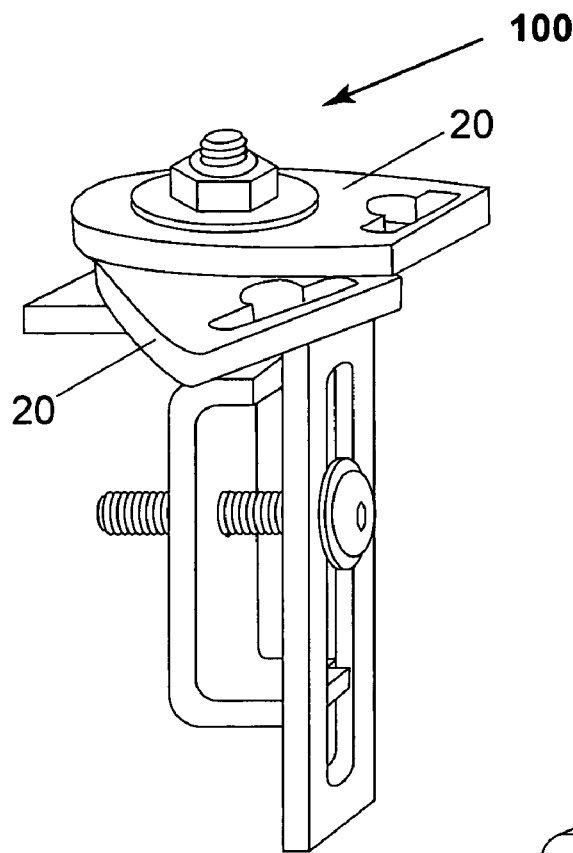
FIG. 4 is a top right perspective view of a universal tie down in accordance with one embodiment of the invention.

FIG. 4 illustrates a perspective view of an alternative embodiment of 100A, labeled 100B. 100B is identical to the preferred embodiment 100A with the exception that it contains a plurality of swivel head 20s.

Figure 5:
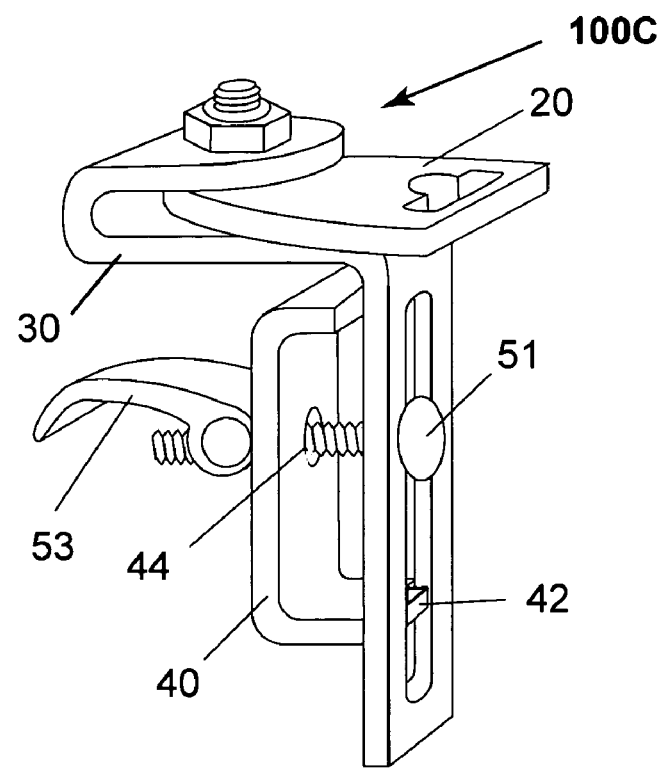
FIG. 5 is a top right perspective view of a universal tie down in accordance with one embodiment of the invention.

FIG. 5 illustrates a perspective view of an alternative embodiment of 100A, labeled 100C. 100C is identical to the preferred embodiment 100A with the exception that Horizontal support portion of L-body 30 is folded back on itself, thus limiting head 20 from swiveling through 360 degrees as in embodiments 100A and 100B. In embodiment 100C, friction or spring bias may be used to automatically move head 20 to the side when not in use, thus preventing or reducing head 20's encroachment into the pickup truck's bed, thus reducing the risk of scratching or catching while loading and unloading cargo. FIG. 5 also illustrates that a camlock 53 or a common nut could be used in place of threaded bore 44 to allow easy adjustment and clamping of any of the disclosed embodiments herein.

FIGS. 6 through 8 illustrate how rigid members 60 could be used in conjunction with embodiments 10A, 10B, or 100C. In FIG. 6, swiveling head 20 is installed and a bolt is used to secure rigid member 60. In FIG. 7, head 20 is removed and rigid member 60 is bolted in place using the bores used to attach head 20. Embodiments 100A, 100B, or 100C may be used with swivel head 20 installed on L-body 30 or removed, as in FIG. 7, to facilitate attachment of rigid members 60 or other bolt-on devices.

What I claim is:

1. A cargo restraint and support device used in combination with a pick-up truck including a cargo box with side rails having a downward protruding flange, said device capable of being attached at a variety of positions along said side rail, said anchor device comprising:
    an L-body, a C-body, and a means for drawing the L and C bodies together, securing by clamping action, said bodies to said downward protruding flange when said flange is placed between said C-body and L-body;
    at least one swiveling head attached to said L-body and containing an opening through which a cargo restraint may be attached.

\* \* \* \* \*